(12) United States Patent
Kaneuchi et al.

(10) Patent No.: US 10,569,496 B2
(45) Date of Patent: Feb. 25, 2020

(54) TRANSFER FILM AND METHOD FOR MANUFACTURING TRANSFER FILM

(71) Applicant: Panasonic Intellectual Property Management Co., Ltd., Osaka (JP)

(72) Inventors: Kazuhiko Kaneuchi, Osaka (JP); Gakuei Shibata, Osaka (JP); Tomoyuki Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 515 days.

(21) Appl. No.: 15/324,099

(22) PCT Filed: Nov. 27, 2015

(86) PCT No.: PCT/JP2015/005902
§ 371 (c)(1),
(2) Date: Jan. 5, 2017

(87) PCT Pub. No.: WO2016/139705
PCT Pub. Date: Sep. 9, 2016

(65) Prior Publication Data
US 2017/0210084 A1    Jul. 27, 2017

(30) Foreign Application Priority Data
Mar. 2, 2015  (JP) .................................. 2015-039738

(51) Int. Cl.
*B32B 3/26*  (2006.01)
*B32B 38/18*  (2006.01) *B32B 27/18* (2006.01)
*B32B 37/00*  (2006.01)
(Continued)

(52) U.S. Cl.
CPC ................ *B32B 3/26* (2013.01); *B29C 45/14* (2013.01); *B29C 45/14827* (2013.01);
(Continued)

(58) Field of Classification Search
CPC .................................................. B29C 63/0095
See application file for complete search history.

(56) References Cited

U.S. PATENT DOCUMENTS

| 2005/0090394 | A1 | 4/2005 | Hirota et al. |
| 2005/0183769 | A1* | 8/2005 | Nakagawa ........... H01G 9/2031 |
| | | | 136/263 |

(Continued)

FOREIGN PATENT DOCUMENTS

| JP | 2008-087392 A | 4/2008 |
| JP | 2010-149388 | 7/2010 |

(Continued)

OTHER PUBLICATIONS

Dhandapani, C.; Narayanasanny, R.; Karthick, S.; Selvam, S.; Hemelatha, P.; Suresh Kumar, M.; Dinesh Kirupha, S.; Kim, H.; "Drastic photocatalytic degradation of methylene blue dye by neodymium doped zirconium oxide as photocatalyst under visible light irradiation", Optik, 2016, 127, p. 10288-10296.*

(Continued)

*Primary Examiner* — Mark Ruthkosky
*Assistant Examiner* — Julia L Rummel
(74) *Attorney, Agent, or Firm* — Panasonic IP Management; Kerry S. Culpepper

(57) ABSTRACT

Photocatalyst microparticles are provided in a photocatalyst layer coming into contact with a base film, the photocatalyst microparticles are irradiated with ultraviolet rays, and voids are formed in a boundary region between a protective layer and the photocatalyst layer.

6 Claims, 10 Drawing Sheets

(51) Int. Cl.
  *B32B 38/00* (2006.01)
  *B44C 1/17* (2006.01)
  *B29C 45/14* (2006.01)
  *B32B 37/24* (2006.01)

(52) U.S. Cl.
  CPC ............ *B32B 27/18* (2013.01); *B32B 37/025* (2013.01); *B32B 38/0008* (2013.01); *B32B 38/18* (2013.01); *B44C 1/1712* (2013.01); *B32B 2037/243* (2013.01); *B32B 2310/0831* (2013.01)

(56) References Cited

U.S. PATENT DOCUMENTS

| | | |
|---|---|---|
| 2014/0322496 A1 | 10/2014 | Lee et al. |
| 2015/0017371 A1 | 1/2015 | Rho |
| 2015/0064371 A1 | 3/2015 | Kaneuchi et al. |
| 2015/0207107 A1* | 7/2015 | Schwartz ............ H01L 51/5281 257/40 |

FOREIGN PATENT DOCUMENTS

| | | |
|---|---|---|
| JP | 2011-224915 | 11/2011 |
| JP | 2012-045781 | 3/2012 |
| JP | 2012-096412 | 5/2012 |
| JP | 2014-205247 | 10/2014 |

OTHER PUBLICATIONS

International Search Report of PCT application No. PCT/JP2015/005902 dated Dec. 22, 2015.

* cited by examiner

TRANSFER FILM AND METHOD FOR MANUFACTURING TRANSFER FILM

CROSS-REFERENCE TO RELATED APPLICATION

This application is a U.S. national stage application of PCT International Application No. PCT/JP2015/005902 filed on Nov. 27, 2015, which claims the benefit of foreign priority of Japanese patent application No. 2015-039738 filed on Mar. 2, 2015, the contents all of which are incorporated herein by reference.

TECHNICAL FIELD

The present invention relates to a transfer film used for in-molding and a method for manufacturing the transfer film.

BACKGROUND ART

In recent years, a wide range of designs is needed for decorations in fields of the exterior of AV appliances, mobile phones, or household electric appliances and the interior of vehicles due to various customer preferences, and designs considering exterior appearance and texture of surfaces of products are required in some cases. In regards to the requirements, a concavo-convex pattern may be transferred to a surface of a product to apply a certain texture, in order to apply hairline or pleat having a concavo-convex pattern to a surface of a product as the design, in accordance with customer preferences. A concavo-convex pattern may be formed on a surface of a product by bonding a concavo-convex pattern to a surface of a product using a transfer film at the time of in-molding of a product.

First, a configuration of a typical transfer film having a concavo-convex pattern used in in-molding will be described with reference to FIG. 6. FIG. 6 is a sectional view showing a layer configuration of the typical concavo-convex pattern-attached transfer film.

Transfer film 201 having a concavo-convex pattern is a continuous film. Transfer film 201 having a concavo-convex pattern is broadly configured with carrier layer 202 which is not transferred to a molded product and transfer layer 203 which is to be transferred to a surface of a molded product. Transfer film 201 having a concavo-convex pattern will be more specifically described. A reference numeral 204 denotes a base film formed of PET or an acrylic film which has a function of continuously supplying transfer film 201 having a concavo-convex pattern into a die. A reference numeral 205 denotes a peeling layer which peels base film 204 and transfer layer 203 to be transferred to a molded product from each other, and a concavo-convex pattern is applied to peeling layer 205 in advance, in order to transfer the concavo-convex pattern to the outermost surface of transfer layer 203. A reference numeral 206 denotes a protective layer or a hard coat layer which has a concavo-convex pattern for applying a certain texture to an outermost surface of a molded product and applies strength or rigidity to transfer layer 203 to prevent scratches or contaminations. A reference numeral 207 denotes an anchor layer or a primer layer for easily performing ink printing and improving adhesiveness between ink and protective layer 206 or the hard coat layer. A reference numeral 208 denotes a coloring layer for applying a color, a pattern, or a design onto transfer layer 203 with ink. A reference numeral 209 denotes an adhesive layer which has a function of bonding a molten resin to transfer layer 203. As described above, transfer film 201 having a concavo-convex pattern is configured with a plurality of layers.

A manufacturing process for transferring transfer film 201 having a concavo-convex pattern described above to a surface of a molded product in an in-molding process will be described with reference to FIGS. 7A to 7H. FIGS. 7A to 7H are views explaining each step of an in-molding process.

In FIG. 7A, first, transfer film 201 having a concavo-convex pattern is transported to a predetermined position between fixed die 1 and movable die 2 using foil feeder 3. At this time, transfer film 201 having a concavo-convex pattern is disposed so that a transfer layer side of transfer film 201 faces movable die 2. Transfer type film 201 having a concavo-convex pattern may be transported into a die, after being preheated using a heater (not shown), so that transfer film 201 is easily shaped in a die. Next, after transfer type film 201 having a concavo-convex pattern is transported to a predetermined position, as shown in FIG. 7B, suction holes 4 penetrated through a cavity surface of movable die 2 suck transfer type film 201 having a concavo-convex pattern, and transfer type film 201 having a concavo-convex pattern is shaped onto the cavity surface of movable die 2. At that time, the outer periphery of transfer type film 201 having a concavo-convex pattern is fixed by a film pressing mechanism (not shown) and transfer type film 201 is positioned. After that, as shown in FIG. 7C, movable die 2 is moved to clamp the fixed die. Then, as shown in FIG. 7D, molten resin 6 is injected towards an adhesive layer of the surface of transfer type film 201 having a concavo-convex pattern by gate 5 of fixed die 1, and the inner portion of the cavity in the die is filled with molten resin 6. Next, as shown in FIG. 7E, when the filling with molten resin 6 is completed, molten resin 6 is cooled to a predetermined temperature. Then, as shown in FIG. 7F, movable die 2 is moved to be released from the fixed die, carrier layer 202 of transfer type film 201 having a concavo-convex pattern is peeled off from in-mold molded product 7 and only transfer layer 203 is transferred, when extracting the in-mold molded product 7, and thus, a state in which transfer layer 203 having a concavo-convex pattern is transferred to an outermost surface of in-mold molded product 7 is obtained. After that, as shown in FIG. 7G, knock-out pins 8 on fixed die 1 side are pressed to extract molded product 7 from the inner portion of the die. Finally, as shown in FIG. 7H, suction performed by suction holes 4 of movable die 2 with respect to the carrier layer of transfer type film 201 having a concavo-convex pattern into the cavity of movable die 2 is stopped for the next molding. Transfer type film 201 having a concavo-convex pattern used in the next molding is transported to a predetermined position by foil feeder 3, and this operation is repeatedly performed to perform continuous molding (see PTL 1).

CITATION LIST

Patent Literature

PTL 1: Japanese Patent Unexamined Publication No. 2012-096412

SUMMARY OF THE INVENTION

Technical Problems

In typical transfer film 201 having a concavo-convex pattern described above, a method of forming a protective layer or a hard coat layer on a peeling layer having a concavo-convex pattern, after forming a concavo-convex pattern on the peeling layer is used. However, in this method, a coating agent for a protective layer or a hard coat layer is applied onto the peeling layer having a concavo-convex pattern, and accordingly, the coating agent for a protective layer or a hard coat layer flows into a concavo-convex pattern on the peeling layer, and the concavo-convex portion on the peeling layer is formed on an outermost surface of a protective layer or a hard coat layer. Thus, at the time of in-molding, the transfer layer is transferred to a surface of a molded product, and then, a concavo-convex pattern is applied to a protective layer or a hard coat layer on the outermost layer thereof.

Accordingly, a contact area of a peeling layer and a protective layer or a hard coat layer in a concavo-convex pattern portion of the peeling layer becomes large, points of contact between the peeling layer and the protective layer or the hard coat layer increase in the concavo-convex pattern portion. As a result, adhesiveness is improved, and the peeling layer and the protective layer or the hard coat layer are hardly peeled off from each other. As described above, a phenomenon in which adhesiveness between the peeling layer and the protective layer or the hard coat layer is excellent and the peeling layer and the protective layer or the hard coat layer are hardly peeled off from each other is defined as that peel strength is high. In contrast, a phenomenon in which adhesiveness between the peeling layer and the protective layer or the hard coat layer is decreased and the peeling layer and the protective layer or the hard coat layer are easily peeled off from each other is defined as that peel strength is low. Therefore, when the peel strength between the peeling layer and the protective layer or the hard coat layer is excessively high, some parts of the protective layer or the hard coat layer which should be transferred to the surface of a molded resin at the time of the molding are not smoothly peeled off from the peeling layer. The protective layer or the hard coat layer are not completely released from the peeling layer and some parts of protective layer or the hard coat layer remain on the peeling layer to cause transfer failure.

In the transfer film having a concavo-convex pattern, in a case where peel strength between the peeling layer and the protective layer or the hard coat layer is excessively high at the time of molding and the protective layer or the hard coat layer is not cleanly transferred to a surface of a molded product to cause transfer failure, it is originally necessary to adjust the peel strength between the peeling layer of the concavo-convex portion and the protective layer or the hard coat layer to be low. However, in the transfer film having a concavo-convex pattern of the related art, in a case of decreasing the peel strength by adjusting the peel strength between the peeling layer of the concavo-convex portion and the protective layer or the hard coat layer, a method of adjusting the peel strength of the peeling layer by changing a composition materials of the peeling layer, decreasing a film thickness of the peeling layer, or decreasing a depth of the concavo-convex pattern was mainly used, as means for adjusting the peel strength between the peeling layer on the film side and the protective layer or the hard coat layer, and the peel strength was optimized for each material laminated on the peeling layer. Accordingly, the composition of materials of the peeling layer and the depth of the concavo-convex pattern are repeatedly changed through trial and error by considering the materials laminated on the peeling layer, and time takes for the optimizing. Thus, this was a method performed at high cost. That is, it was difficult to immediately and freely adjust the peel strength in accordance with various conditions, it was difficult to adjust the peel strength, when the composition is determined once, and it was difficult to easily optimize the peel strength. When the depth of the concavo-convex pattern was decreased in order to adjust the peel strength, the texture of the concavo-convex pattern which was an original object was also decreased.

The present invention has been made to solve the aforementioned problems of the related art and an object thereof is to easily optimize peel strength between a peeling layer having a concavo-convex (an uneven) pattern and a transfer layer.

Solutions to Problems

In order to achieve the object, there is provided a transfer film for in-molding, including: a base film; a photocatalyst layer which is formed to come into contact with the base film; an uneven pattern which is formed on a rear surface of the photocatalyst layer on a side opposite to a surface coming into contact with the base film; and a transfer layer which is formed to come into contact with the rear surface of the photocatalyst layer on the side opposite to the surface coming into contact with the base film. The transfer film further includes: photocatalyst microparticles included in the photocatalyst layer; and a plurality of voids which are formed on at least boundary surfaces between the photocatalyst layer and the transfer layer of any one or both of the photocatalyst layer and the transfer layer.

The plurality of voids are formed by irradiating the photocatalyst microparticles with ultraviolet rays, and an amount of the plurality of voids is adjusted in accordance with an amount of emitted light of ultraviolet rays.

In addition, there is provided a method for manufacturing a transfer film including: a step of laminating a base film, a photocatalyst layer including photocatalyst microparticles, and a transfer layer formed of an organic resin, in this order; and a step of irradiating the photocatalyst layer with ultraviolet rays and forming a plurality of voids on at least boundary surfaces between the photocatalyst layer and the transfer layer of any one or both of the photocatalyst layer and the transfer layer. In the method, electrons are generated in the photocatalyst layer by the emission of the ultraviolet rays, at least some of the electrons enter the transfer layer to decompose some of the organic resins, and the voids are formed, and an amount of the voids formed by the amount of emitted light of the ultraviolet rays is adjusted.

ADVANTAGEOUS EFFECTS OF INVENTION

As described above, according to the uneven pattern-attached transfer film and the method for manufacturing the transfer film of the invention, transfer failure of an uneven pattern to a surface of a molded product at the time of in-molding hardly occurs in the transfer film having an uneven pattern, and it is possible to optimally adjust peel strength between a photocatalyst layer and a transfer layer.

DESCRIPTION OF EMBODIMENTS

Hereinafter, embodiments of the invention will be described with reference to the drawings.

(Exemplary Embodiment 1)

Figure 1:
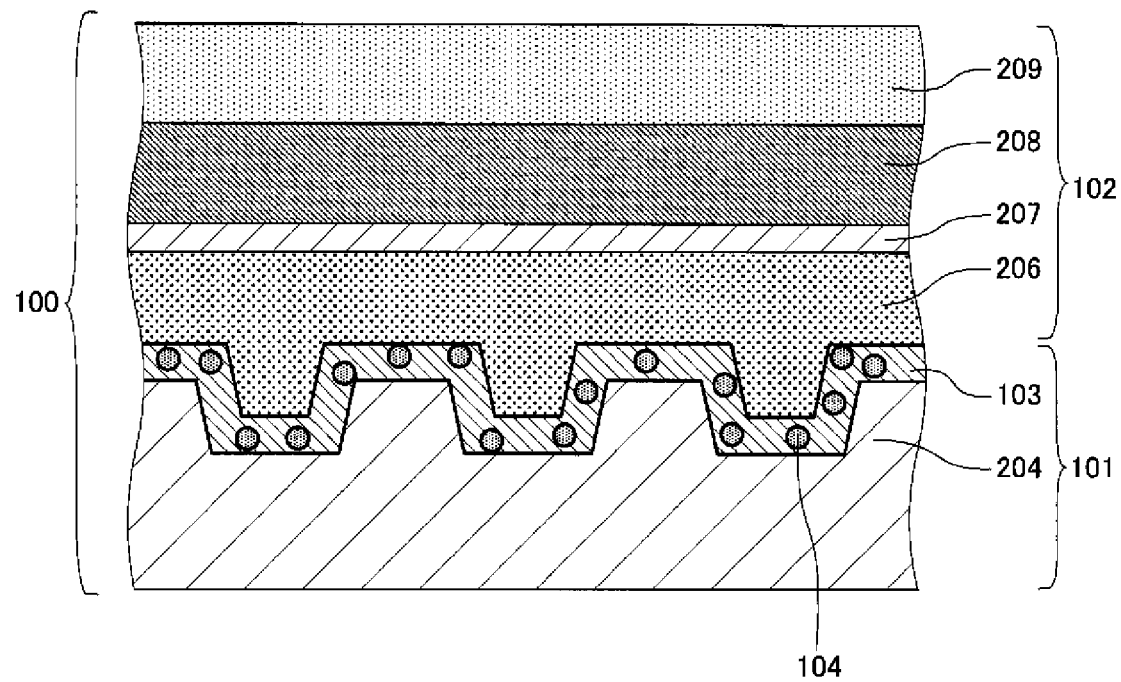
FIG. 1 is a sectional view showing a configuration of a concavo-convex (an uneven) pattern-attached transfer film of Exemplary Embodiment 1 of the invention.
Figure 6:
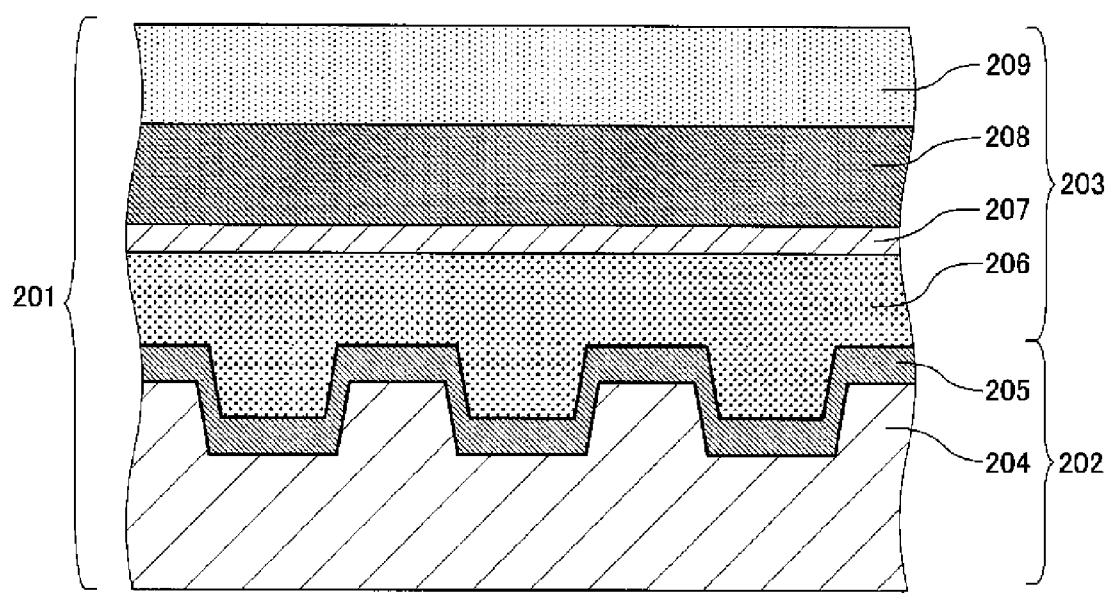
FIG. 6 is a sectional view showing a layer configuration of a typical concavo-convex pattern-attached transfer film.
Figure 7A:
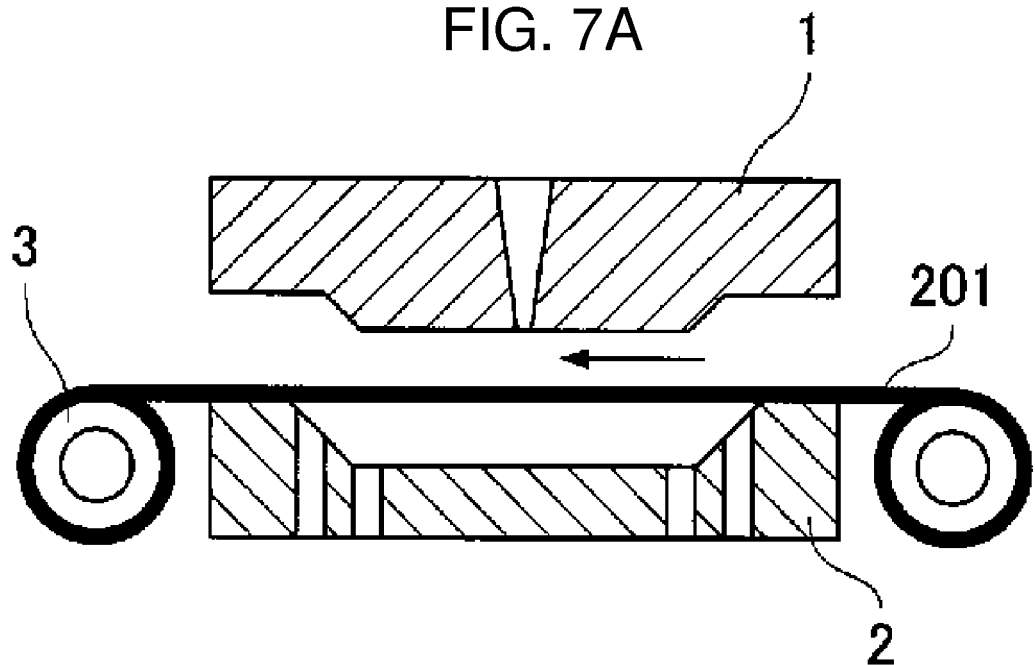
FIG. 7A is a view explaining one step of an in-molding process.
Figure 7B:
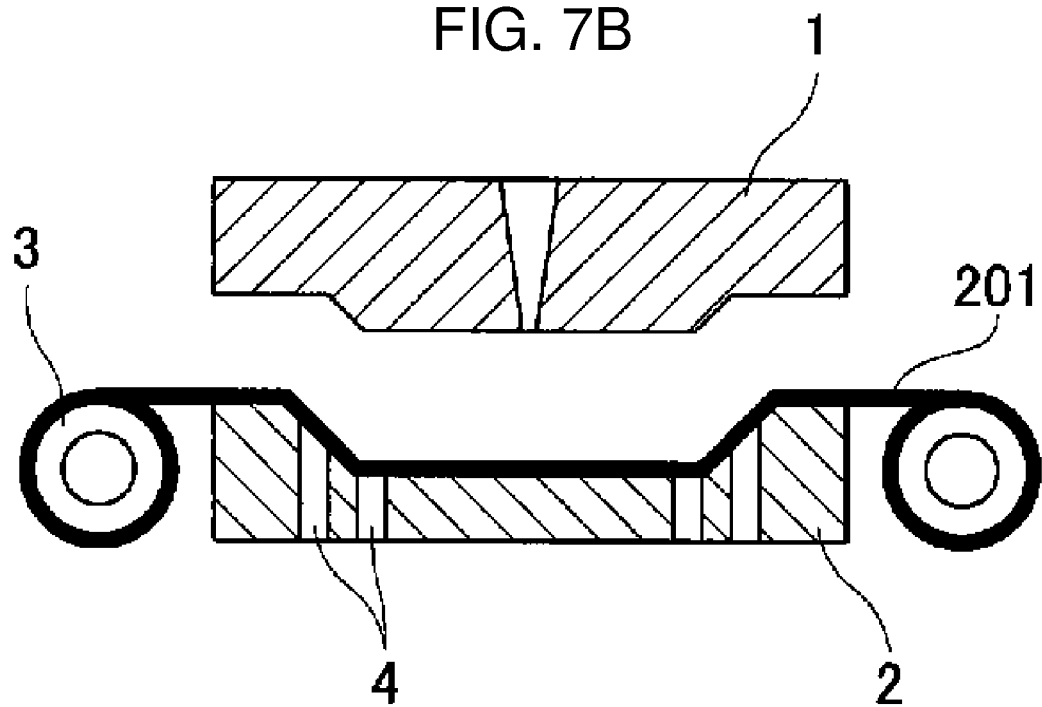
FIG. 7B is a view explaining one step of the in-molding process.
Figure 7C:
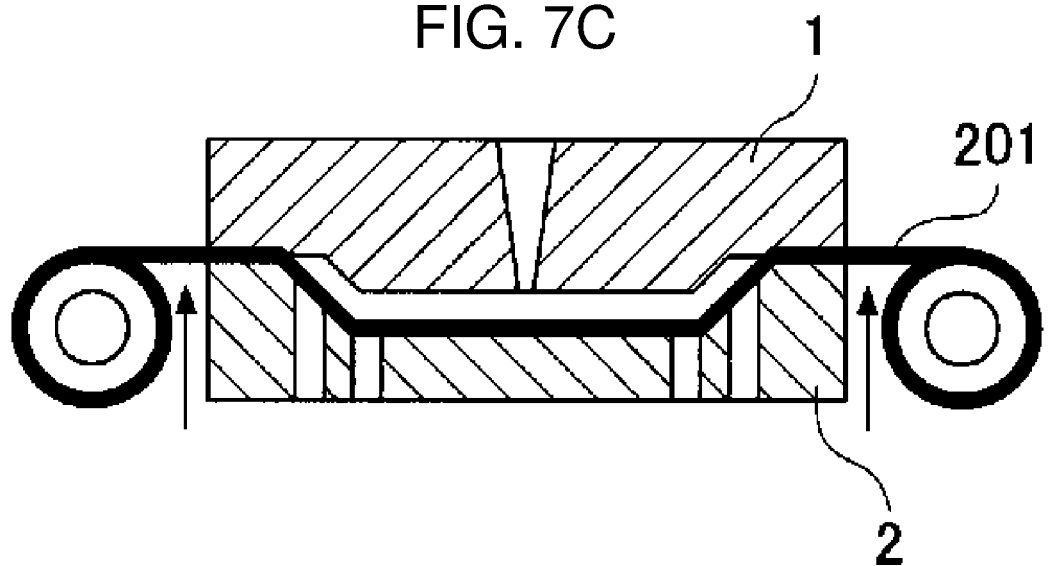
FIG. 7C is a view explaining one step of the in-molding process.
Figure 7D:
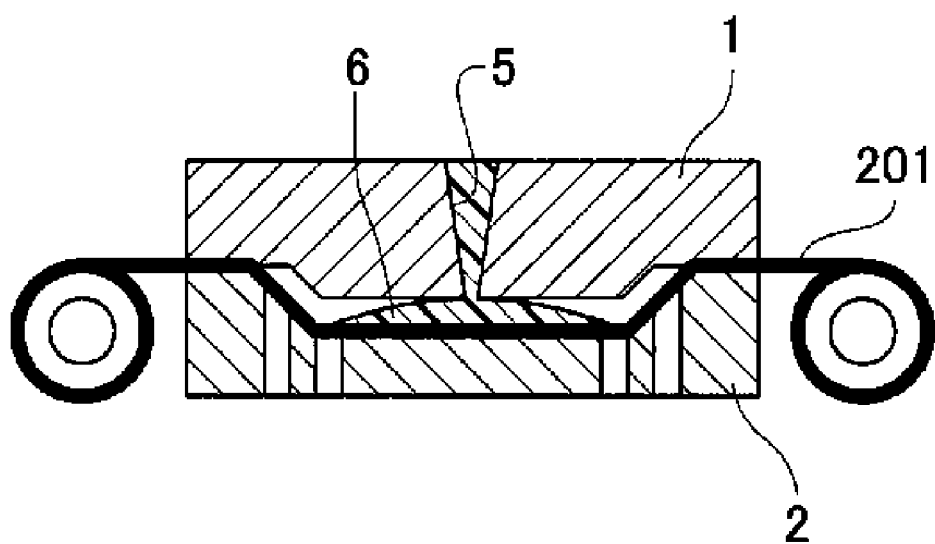
FIG. 7D is a view explaining one step of the in-molding process.
Figure 7E:
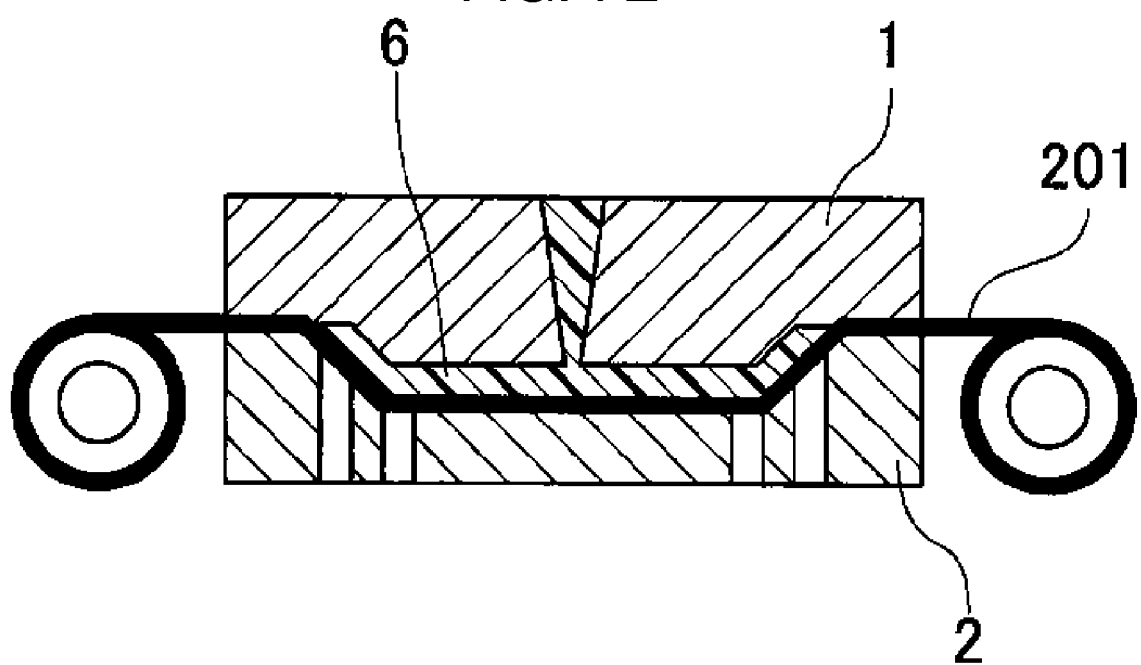
FIG. 7E is a view explaining one step of the in-molding process.
Figure 7F:
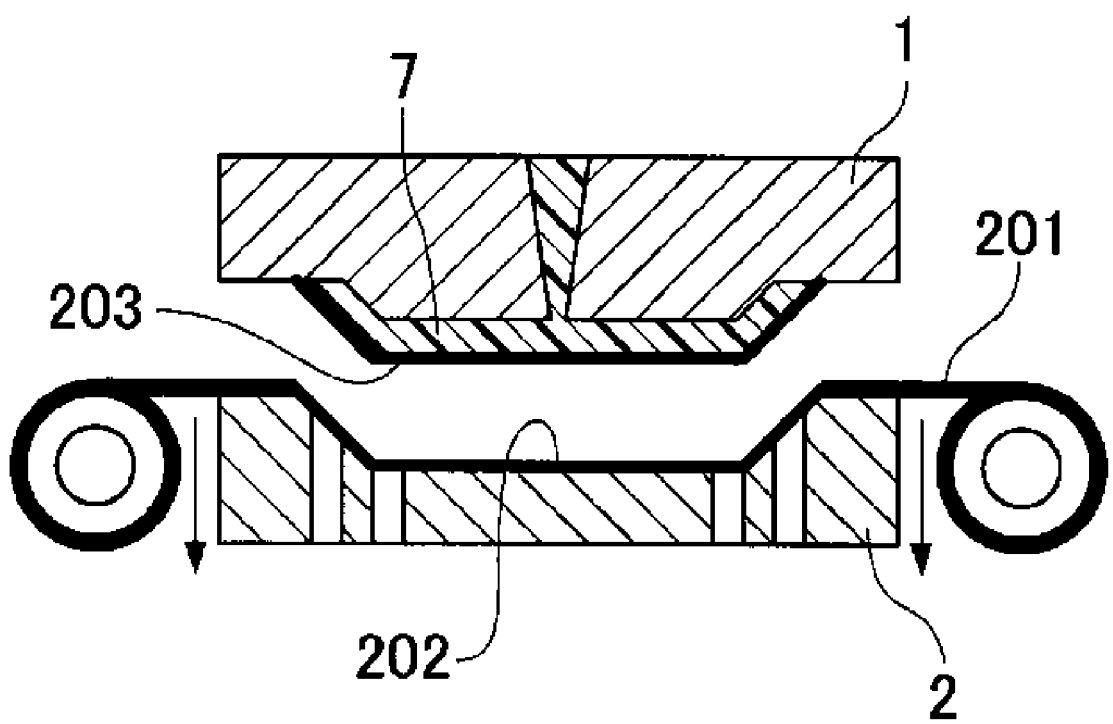
FIG. 7F is a view explaining one step of the in-molding process.
Figure 7G:
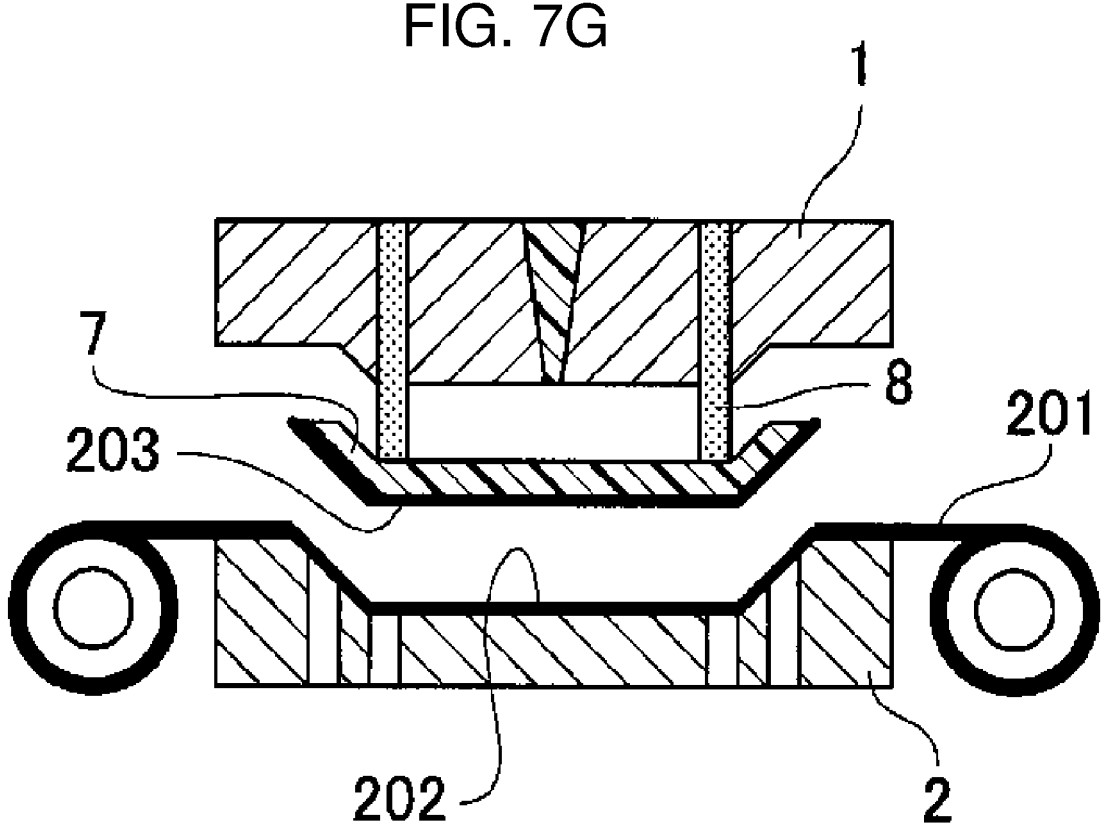
FIG. 7G is a view explaining one step of the in-molding process.
Figure 7H:
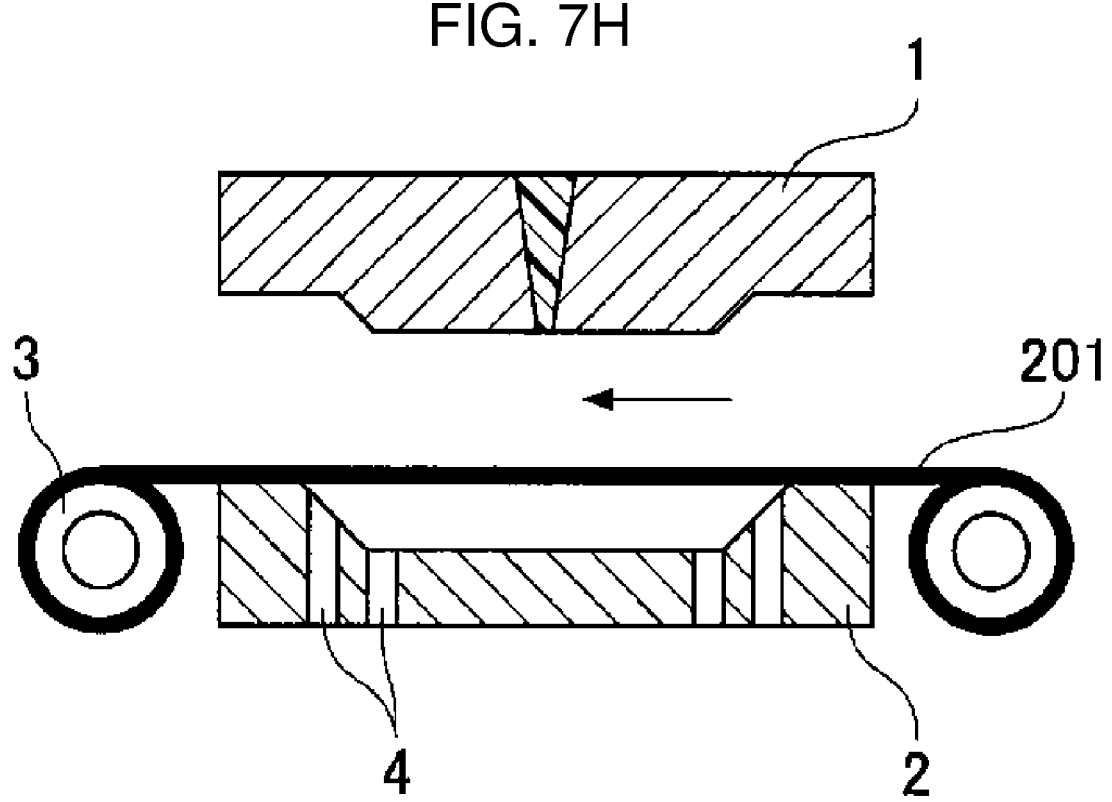
FIG. 7H is a view explaining one step of the in-molding process.

FIG. 1 is a sectional view showing a configuration of a concavo-convex (an uneven) pattern-attached transfer film of Exemplary Embodiment 1 of the invention. The same reference numerals are used in FIG. 1 for the same constituent elements shown in FIGS. 6 to 7H and the description thereof will be omitted.

A layer configuration of concavo-convex (uneven) pattern-attached transfer film 100 of the invention shown in FIG. 1 is configured with carrier layer 101 and transfer layer 102. Carrier layer 101 is basically configured with base film 204, photocatalyst layer 103 which has a function of a peeling layer of a film for in-molding of the related art, protective layer 206 which is a protective film or a hard coat film, anchor layer 207, coloring layer 208, and adhesive layer 209. An antistatic layer may be provided on a side of base film 204 opposite to photocatalyst layer 103, if necessary. Protective layer 206 is a film which has a concavo-convex (an uneven) pattern for applying a certain texture to an outermost surface of a molded product and applies strength or rigidity to transfer layer 102 to prevent scratches or contaminations. Anchor layer 207 is a layer for easily performing ink printing and improving adhesiveness between ink and protective layer 206 and conceptually includes a primer layer or other layers.

Concavo-convex pattern-attached transfer film 100 of the invention will be described in detail. Generally, as base film 204, a PET film or an acrylic film having an average film thickness of 20 to 100 μm inclusive can be used. In this specification, a PET film having an average film thickness of 50 μm was used. Next, photocatalyst layer 103 of the invention will be described. In photocatalyst layer 103, photocatalyst microparticles 104 which exhibit photocatalysis are included in a resin. As photocatalyst microparticles 104, titanium oxide or zinc oxide which is comparatively easily obtained is preferably used, for example. However, metal oxides such as tin oxide, iron oxide, zirconium oxide, tungsten oxide, chromium oxide, molybdenum oxide, ruthenium oxide, germanium oxide, lead oxide, cadmium oxide, copper oxide, vanadium oxide, niobium oxide, tantalum oxide, manganese oxide, cobalt oxide, rhodium oxide, nickel oxide, or rhenium oxide, and strontium titanate can also be substituted as photocatalyst microparticles 104. Photocatalyst microparticles 104 are not necessarily limited to these elements, and other elements are used, as long as the same effects are obtained. Photocatalyst microparticles 104 may be used with one kind or in combination of two or more kinds thereof. The resin configuring photocatalyst layer 103 may be an inorganic resin or an organic resin, and thermosetting resins such as a silicone-based resin, an amino alkyd-based resin, an olefin-based resin, or a melamine-based resin can be used. There is no limitation to these resins, and other resins are used, as long as the same effects can be obtained. A melamine-based resin was used as the resin configuring photocatalyst layer 103 of the invention. It is desirable that photocatalyst layer 103 is formed to have an average film thickness of 0.2 μm to 3 μm inclusive, and more preferably in a range of 0.5 μm to 2 μm inclusive, in which a peeling function of photocatalyst layer 103 and flexibility at the time of in-molding are easily stabilized. In a case where the average film thickness thereof is smaller than 0.2 μm, it is difficult for photocatalyst layer 103 to have a sufficient peeling function as the peeling layer. When the average film thickness thereof is greater than 3 μm, it is difficult to obtain sufficient flexibility at the time in-molding, and fractures and fine cracks are easily generated at the time of in-molding. In the composition of photocatalyst layer 103, proportions of weights of photocatalyst microparticles 104 determining photocatalysis and the resin in the photocatalysis of photocatalyst layer 103 are obtained in terms of 100% by mass of solid content. In a case where titanium oxides having an average particle diameter of 0.05 μm are used as photocatalyst microparticles 104, it is desirable that photocatalyst microparticles 104 are dispersed with a proportion of 20% by mass to 90% by mass inclusive. The proportion of weight of photocatalyst microparticles 104 is more preferably 50% by mass to 80% by mass inclusive which is a range in which photocatalysis and peel strength of photocatalyst layer 103 are stable. When the proportion of weight thereof is smaller than 20% by mass, photocatalysis of photocatalyst layer 103 is not sufficiently exhibited. When the proportion of weight thereof is greater than 90% by mass, the amount of resin components of the photocatalyst layer becomes excessively small, peel strength between the photocatalyst layer and protective layer 206 formed on photocatalyst layer 103 is excessively low from an initial stage, and thus, it is difficult to maintain peel strength necessary for in-molding.

As photocatalyst microparticles 104 dispersed in photocatalyst layer 103, sol type, sphere type, or porous type photocatalyst microparticles can be used. The photocatalyst microparticles having an average particle diameter in a range of 0.01 μm to 0.2 μm inclusive are desirably used. In a case where the average particle diameter thereof is smaller than 0.01 μm, it is difficult to sufficiently obtain photocatalytic effects of photocatalyst layer 112, and in a case where the average particle diameter thereof is greater than 0.2 μm, aggregates of photocatalyst microparticles 104 are easily generated when coating photocatalyst layer 112 using a gravure coater and these cause generation of poor appearance of the film caused by photocatalyst microparticles 104. As a method of forming a concavo-convex pattern on photocatalyst layer 103, a method of processing base film 204 with a concavo-convex pattern before coating photocatalyst layer 103 is generally used. In the formation of a concavo-convex pattern on the base film 204, embossing, sand blasting, brushing, or laser beam processing can be generally used, and the method may be suitably selected in accordance with a design required for a concavo-convex portion.

The formation of a certain concavo-convex pattern may be performed by performing printing on photocatalyst layer 103 once or plural times, by previously performing plate making or ink jet printing of a desired concavo-convex pattern by printing.

In the formation of a certain concavo-convex pattern, a desired concavo-convex pattern may be realized by performing embossing, sand blasting, brushing, or laser beam processing on photocatalyst layer 103, after forming a uniform coating film of photocatalyst layer 103 using a normal gravure coater. Other methods are used, as long as a certain concavo-convex pattern can be applied onto photocatalyst layer 103 in the same manner as described above, and there is no limitation.

Next, protective layer 206 which is a protective film or a hard coat film of the invention will be described. It is desirable that the protective layer of the invention is formed to have an average film thickness after drying is 2 μm to 10 μm inclusive. In a case where the average film thickness of protective layer 206 is smaller than 2 μm, protective layer 206 is difficult to have film strength sufficient for protecting a surface of a molded product, after the molding. In a case where the average film thickness thereof is greater than 10 μm, foil cutting is not excellently performed at the time of in-molding and this causes generation of foil burr. The protective film used in the invention is a pre-curing type and 2 liquid curing type acrylic resin and the hard coat film is an ultraviolet curing type and after-curing type hard coat film. In a case of the hard coat film, the after-curing type hard coat material means a type of the hard coat film which is irradiated with ultraviolet rays to be cured, after in-molding. Accordingly, in a stage of transfer film 100 before performing in-molding, the ultraviolet curable resin configuring the hard coat film is present in an uncured or semi-cured state in which the resin is not completely photo-cured (polymerized). The ultraviolet curable hard coat film is generally photo-cured (polymerized) with a high pressure mercury lamp or a metal halide lamp after in-molding.

Next, it is preferable that both of anchor layer 207 and adhesive layer 209 are formed to have an average film thickness after drying in a range of 2 μm to 10 μm inclusive.

Coloring layer 208 may be formed as a single layer or a plurality of layers depending on a design and concealment. Coloring layer 208 may be formed as a single layer or a plurality of layers and it is preferable that coloring layer is formed to have an average film thickness in a range of 0.5 μm to 15 μm inclusive.

As a method of forming anchor layer 207, coloring layer 208, and adhesive layer 209, a gravure coater, a comma coater, a roll coater, gravure printing, screen printing, or ink jet printing is used. Coloring layer 208 can be formed by using a suitable method such as metal deposition, sputtering, or coating without using ink, in accordance with a design. A layer configuration without anchor layer 207 may be used, by applying the function of anchor layer 207 to protective layer 206. In a case where coloring layer 208 is not necessary for a design and only a concavo-convex pattern is desired to be transferred to a surface of a molded product in in-molding, and in a case where the function of adhesive layer 209 can be applied to protective layer 206, adhesive layer 209 can be omitted.

In a case where a plurality of functions can be applied to each layer as described above, the concavo-convex pattern-attached transfer film may be formed by omitting each layer, if necessary.

Figure 2:
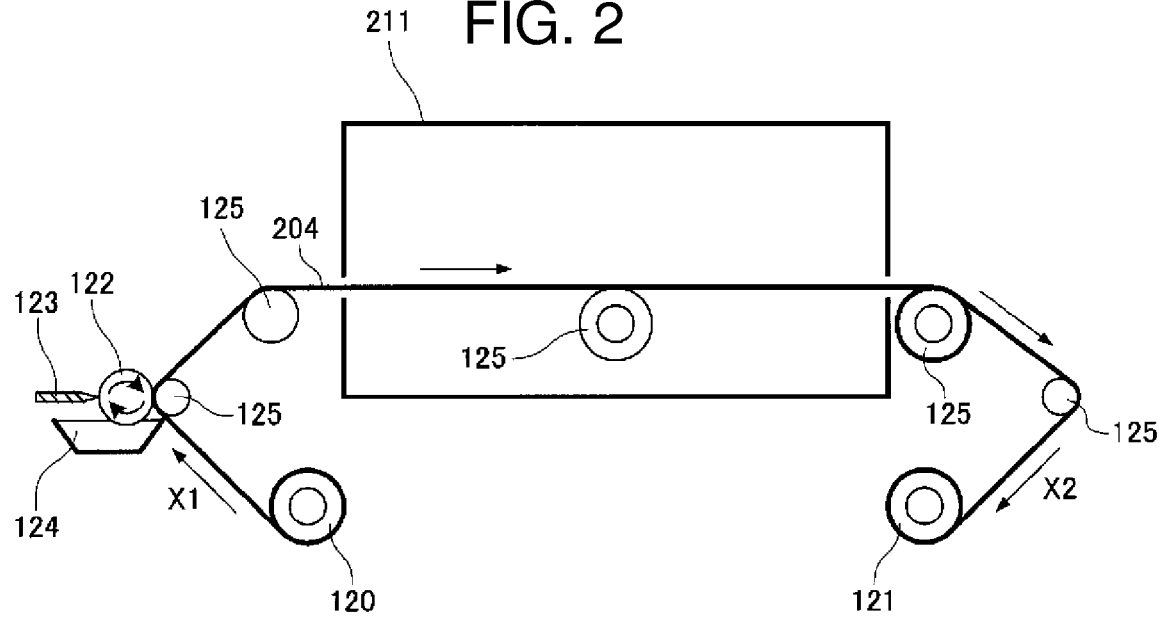
FIG. 2 is a sectional view explaining a coating process of a photocatalyst layer of the concavo-convex pattern-attached transfer film of the invention.

Next, a coating process of a photocatalyst layer at the time of manufacturing the concavo-convex pattern-attached transfer film of the invention will be described with reference to FIGS. 1 and 2. FIG. 2 is a sectional view explaining a coating process of a photocatalyst layer of the concavo-convex pattern-attached transfer film of the invention. The same reference numerals are used in FIG. 2 for the same constituent elements shown in FIGS. 1 and 6 to 7H and the description thereof will be omitted.

In the invention, base film 204 obtained by forming a certain concavo-convex pattern on a PET film by embossing was used. In base film 204, an antistatic layer is formed on a surface on a side opposite to the surface to which a concavo-convex pattern is applied. Photocatalyst layer 103 is disposed on a coating surface side of the surface of the PET film of base film 204 to which a concavo-convex pattern is applied. Roll-to-roll coating equipment includes unwinding unit 120 for base film 204 which is continuously supplied to be coated with a photocatalyst coating solution and winding unit 121 which winds base film 204 coated with the photocatalyst coating solution, and has a structure in which base film 204 is continuously transported in X1 and X2 directions in FIG. 2. The antistatic layer applied to the surface of base film 204 on a side opposite to the coating surface of photocatalyst layer 103 is formed in order to prevent generation of wrinkles on base film 204 due to peeling charge occurring at the time of transporting base film 204. As the kind of base film 204, in addition to PET, a plastic film or a plastic sheet generally formed of a material such as polyacryl, polyurethane, polyolefin, polycarbonate, or triacetyl cellulose may be used. An average thickness of the PET film configuring base film 204 is suitably selected in accordance with the purpose, and an average thickness of a base material used in roll-to-roll coating is preferably in a range of 20 μm to 250 μm inclusive. When the average thickness thereof is smaller than 20 μm, it is difficult to control tension at the time of transportation, and plastic deformation may occur to cause elongation or wrinkles, or the base film may be warped due to shrinkage in heat curing when drying a coating agent at the time of laminating various functional layers to be formed on base film 204, and thus, it is difficult to use the base film in subsequent steps. When the average thickness thereof is greater than 250 μm, a coating length at the time of creating a roll becomes long, a diameter of a winding core of the roll when performing roll winding becomes excessively large, and thus, it is difficult to use the base film in subsequent steps, or the cost of PET film is increased. However, there is no limitation to the range described above, and a PET film having an average thickness beyond the range described above or other resin films may be used in accordance with needs or purposes. In Exemplary Embodiment 1 of the invention, the photocatalyst layer was applied by using the roll-to-roll coating equipment and a PET film having an average thickness of 50 µm was used as base film 204.

A gravure heater is used in order to apply a photocatalyst coating material for forming a photocatalyst layer to the PET surface of base film 204. Accordingly, the roll-to-roll coating equipment further includes gravure roller 122 for applying a photocatalyst coating material onto base film 204, and guide roller 125 for applying tension to base film 204. Guide roller 125 applies tension to base film 204 when transferring a photocatalyst coating material onto base film 204 by gravure roller 122, and is provided on a side opposite to gravure roller 122 with base film 204 interposed therebetween. A groove (not shown) having a depth of several tens µm formed of a thin line is formed on gravure roller 122 in a spiral shape, and a photocatalyst coating material is supplied to this groove. Gravure roller 122 is rotated clockwise as shown in FIG. 2, and a photocatalyst coating material is supplied to the spiral groove of gravure roller 122 through a liquid pan 124 which is for supplying a photocatalyst coating material and includes a photocatalyst coating material. Next, gravure roller 122 passes through doctor blade 123 which has a function of scraping a predetermined amount of a photocatalyst coating material from the surface of gravure roller 122. Accordingly, before coming into contact with base film 204, gravure roller 122 is in a state where a photocatalyst coating material remains only in the groove. After that, when gravure roller 122 and base film 204 come into contact with each other, a photocatalyst coating material in the groove of gravure roller 122 is transferred to the PET surface of base film 204, and a film of a photocatalyst coating material in a wet state is formed on the PET surface of base film 204. That is, a liquid photocatalyst layer which is uniformly spread is formed on base film 204.

As the method of applying a photocatalyst coating material in the manufacturing process of the concavo-convex pattern-attached transfer film of the invention, various coating and printing methods such as die coating, calendar coating, roll coating, and gravure printing can be used, in addition to the gravure coating.

In the next step, base film 204 on which the photocatalyst layer is formed is transported to thermal drying furnace 211, in order to perform heat curing of a photocatalyst coating material on the PET surface of base film 204. As thermal drying furnace 211, a warm air furnace, an infrared heater (IR) furnace, or a thermal drying furnace using hot air and IR together can be used, and a general thermal drying step is performed. The thermal drying furnace used in the invention performed thermal drying and heat curing of the liquid photocatalyst layer at 150° C. for 1 minute using a hot air circulating furnace, and photocatalyst layer 103 having an average film thickness after drying of 2 µm was formed on base film 204. As a photocatalyst coating material used in the invention, a titanium oxide sol was used as photocatalyst microparticles and a binder which was dispersed together with melamine-based resin was used as a binder.

Figure 3A:
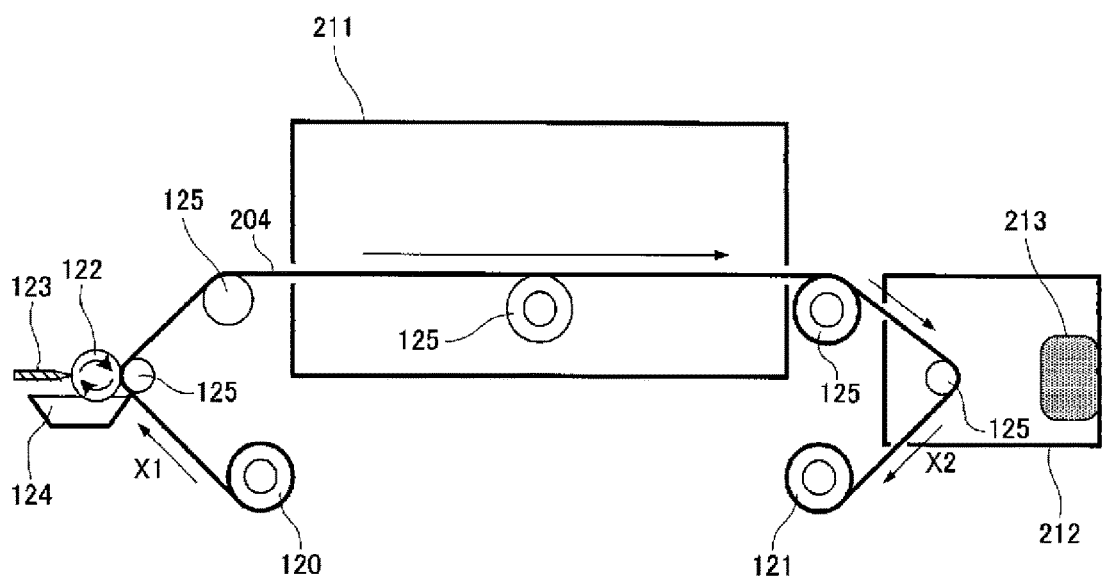
FIG. 3A is a sectional view explaining a coating process of a protective layer of the concavo-convex pattern-attached transfer film of the invention.
Figure 3B:
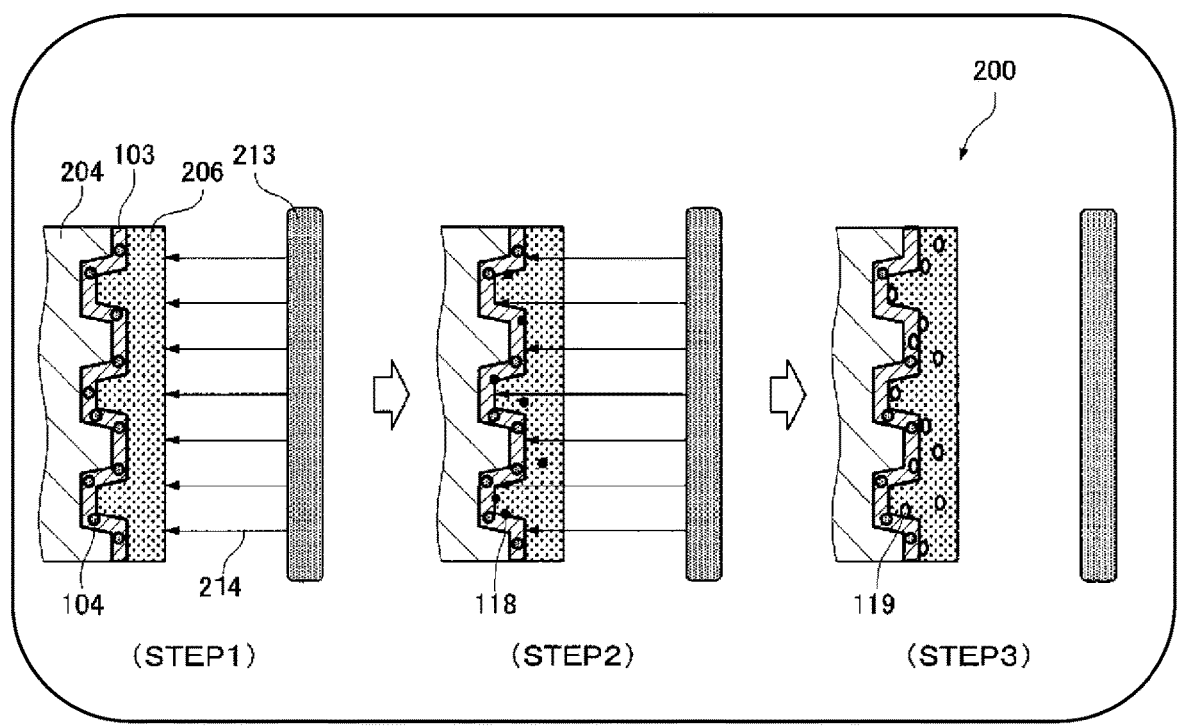
FIG. 3B is a conceptual diagram explaining a process of forming voids of Exemplary Embodiment 1 in order.

Next, a coating process of a protective layer when manufacturing the concavo-convex pattern-attached transfer film of the invention will be described with reference to FIGS. 1 to 3B. FIG. 3A is a sectional view explaining a coating process of a protective layer of the concavo-convex pattern-attached transfer film of the invention. FIG. 3B is a conceptual diagram explaining a process of forming voids of Exemplary Embodiment 1 in order and is a view showing enlarged plan views of main parts in the order of steps. The same reference numerals are used in FIGS. 3A and 3B for the same constituent elements shown in FIGS. 1, 2, and 6 to 7H and the description thereof will be omitted. In the same manner as in the coating process of a photocatalyst coating material of FIG. 2, the coating process of the protective layer in FIG. 3A was performed by the roll-to-roll gravure heater.

Base film 204 which was coated with photocatalyst layer 103 as described above was disposed on winding unit 120 so that photocatalyst layer 103 becomes a surface to be coated, and a coating material for protective layer 206 was applied onto photocatalyst layer 103 of base film 204. A 2 liquid curing type acrylic coating material, as the coating material for protective layer 206 used in the invention, was applied using a gravure heater so that an average film thickness after drying becomes 5 µm, and then, thermal drying and heat curing was performed at 100° C. for 2 minutes using thermal drying furnace 211. By doing so, uniform protective layer 206 was formed on photocatalyst layer 103. When forming protective layer 206 formed of other materials or when forming a functional layer and a transfer layer other than protective layer 206 on photocatalyst layer 103, the coating material applied on photocatalyst layer 103 is repelled due to incompatibility of the resin configuring photocatalyst layer 103, and coating irregularity may be generated. In this case, when ultraviolet irradiation, corona treatment, or plasma treatment is performed on photocatalyst layer 103 in advance, a hydrophilic group is formed on the coating surface of photocatalyst layer 103 due to photocatalysis of photocatalyst microparticles 104 in photocatalyst layer 103 and hydrophilization is performed. As a result, wettability between the coating material applied on photocatalyst layer 103 and photocatalyst layer 103 is improved, the repelling of the coating material on photocatalyst layer 103 is prevented, and coating irregularity is decreased.

After that, ultraviolet rays 214 are emitted by ultraviolet lamp 213 in ultraviolet irradiating unit 212 disposed on the rear stage of thermal drying furnace 211. As ultraviolet lamp 213, low pressure mercury, high pressure mercury, or LED-UV lamp may be used. Next, it is possible to adjust peel strength between photocatalyst layer 103 and protective layer 206 on base film 204 using a mechanism explained with partially enlarged diagrams of FIG. 3B. In STEP 1, when base film 204 is transported to ultraviolet irradiating unit 212, photocatalyst layer 103 is irradiated with ultraviolet rays 214 from ultraviolet lamp 213. At this time, in STEP 2, a large amount of highly reactive electrons 118 from titanium oxides of photocatalyst microparticles 104 in photocatalyst layer 103 is released from photocatalyst microparticles 104 to the outside, and accordingly, a state where a large amount of highly reactive electrons 118 are generated in photocatalyst layer 103. The case of irradiating photocatalyst layer 103 with ultraviolet rays 214 has been shown as an example, but there is no limitation to ultraviolet rays 214, and electromagnetic waves such as X rays can be emitted, as long as it is possible to release electrons 118 in photocatalyst layer 103. Released electrons 118 move within photocatalyst layer 103 and also approach protective layer 206 adjacent thereto. Since an amount of binding energy of organic resins configuring each of photocatalyst layer 103 and protective layer 206 is smaller than an amount of energy of electrons 118, an oxidation-reduction reaction occurs between electrons 118 having a high amount of energy, and organic resins configuring photocatalyst layer 103 and protective layer 206 having an amount of binding energy which is smaller than the amount of energy of electrons 118. With this oxidation-reduction reaction, electrons 118 take positive charges from some organic resins configuring photocatalyst layer 103 and protective layer 206 and are stabilized. As a result, in some organic resins configuring photocatalyst layer 103 and protective layer 206, of which positive charges are taken, the binding between organic resins, of which positive charges are taken, is released, and some organic resins configuring photocatalyst layer 103 and protective layer 206 are decomposed. More specifically, since the organic resins of protective layer 206 are decomposed in order from a portion adjacent to photocatalyst layer 103, the inner portion of protective layer 206 is not decomposed and only the vicinity of the rear surface of protective layer 206 adjacent to photocatalyst layer 103 is decomposed. Alternatively, in protective layer 206, the composition of a boundary portion with photocatalyst layer 103 further proceeds than other areas.

When the oxidation-reduction reaction described above between a large amount of electrons 118 released from photocatalyst microparticles 104 and the organic resins configuring photocatalyst layer 103 and protective layer 206 is repeated and taking of positive electrons from the organic resins configuring photocatalyst layer 103 and protective layer 206 is repeated, the molecular binding in the organic resins configuring photocatalyst layer 103 and protective layer 206 is gradually released, and the composition of the organic resins configuring photocatalyst layer 103 and protective layer 206 gradually proceeds.

Accordingly, in STEP 3 in which emission of specific integral ultraviolet rays 214 is finally finished, a certain amount of organic resins configuring photocatalyst layer 103 and protective layer 206 is decomposed, and countless voids 119 having an average width smaller than the average particle diameter of photocatalyst microparticles 104 are generated in the decomposed portion. In a region where countless voids 119 smaller than photocatalyst microparticles 104 are formed, there are no points of contact between photocatalyst layer 103 and protective layer 206 and adhesiveness between photocatalyst layer 103 and protective layer 206 is deteriorated. Accordingly, in concavo-convex pattern-attached transfer film 200 after emitting ultraviolet rays 214, the peel strength between photocatalyst layer 103 and protective layer 206 is decreased due to an effect of countless voids 119 having a size smaller than the size of photocatalyst microparticles 104 between photocatalyst layer 103 and protective layer 206. At this time, it is possible to adjust the amount of decomposed organic resins configuring photocatalyst layer 103 and protective layer 206 by increasing or decreasing the amount of energy of ultraviolet rays 214 emitted to photocatalyst layer 103. That is, it is possible to adjust the density of voids 119 to adjust the peel strength between photocatalyst layer 103 and protective layer 206. Voids 119 may be present in both of photocatalyst layer 103 and protective layer 206 or may be present on only one side of boundary surfaces of photocatalyst layer 103 and protective layer 206.

In a case of more specifically adjusting peel strength between photocatalyst layer 103 and protective layer 206, organic silicone-based resin or the like is used as the resin configuring photocatalyst layer 103, and accordingly, the decomposition of photocatalyst layer 103 due to photocatalysis of photocatalyst microparticles 104 is decreased. As a result, the decomposition of only organic resin configuring protective layer 206 proceeds, it is possible to decrease the number of voids 119 generated between photocatalyst layer 103 and protective layer 206, unlike in a case of configuring photocatalyst layer 103 with the organic resin, and it is possible to more specifically adjust the peel strength between photocatalyst layer 103 and protective layer 206.

In this specification, in Exemplary Embodiment 1, after coating of protective layer 206, ultraviolet rays 214 generated from a metal halide lamp was adjusted so that integral of light becomes 1200 mJ/cm$^2$ at a wavelength of 365 nm, by using a metal halide lamp as ultraviolet lamp 213 in ultraviolet irradiating unit 212. In Exemplary Embodiment 1, a range of the integral of light of ultraviolet rays emitted to photocatalyst layer 103 is desirably from 700 mJ/cm$^2$ to 5000 mJ/cm$^2$ inclusive. When the integral of light is smaller than 700 mJ/cm$^2$, the number of electrons 118 sufficient for decomposing organic chains in organic resin 115 configuring protective layer 206 in photocatalysis due to photocatalyst layer 103 is not generated, and in a case where the integral of light is greater than 5000 mJ/cm$^2$, base film 204 may be deteriorated. However, the integral of light described above is not limited to the range described above, and may be suitably adjusted in accordance with the kind of base film 204 used, the additive amount of photocatalyst microparticles 104 included in photocatalyst layer 103, and amount of decomposed organic chains of protective layer 206, and the integral of light may be a value beyond the range described above, as long as the same effects of the invention are obtained. In a case of forming an after-curing type hard coat film as protective layer 206, when the hard coat film is cured before molding, the hard coat film is not elongated at the time of molding and failure such as generation of cracks may occur. Accordingly, it is necessary to prevent curing of the hard coat film at the time of irradiating photocatalyst layer 103 with ultraviolet rays 214 in the process described above. As a method thereof, a method of separating a curing wavelength of the hard coat film and a wavelength of ultraviolet rays 214 emitted to photocatalyst layer 103 from each other is used. Specifically, as ultraviolet lamp 213 for irradiating photocatalyst layer 103, an LED-UV lamp having a narrow wavelength range of ultraviolet rays 214 to be emitted can be used. For example, when an LED-UV lamp having a peak wavelength of 385 nm and an ultraviolet generation range of 350 nm to 410 nm inclusive is used as the LED-UV lamp, and a photoinitiator is added to the hard coat film so that a wavelength necessary for the curing of the hard coat film becomes equal to or smaller than 300 nm, when irradiating photocatalyst layer 103 with ultraviolet rays 214 from LED-UV lamp 213, the photoinitiator in the hard coat film prevents the starting of the reaction, and it is possible to realize photocatalysis of photocatalyst layer 103 and to prevent the curing of the hard coat film.

It is preferable that a concavo-convex pattern formed on photocatalyst layer 103 is formed with a difference in level in a range of 1 μm to 10 μm inclusive in a depth direction of transfer film 200. When the difference in level thereof is smaller than 1 μm, the difference in level thereof becomes close to the film thickness of photocatalyst layer 103 which is a peeling layer, and thus, it is difficult to obtain a sufficient rugged shape as a concavo-convex pattern. When the difference in level thereof is greater than 10 μm, it is difficult for photocatalyst layer 103 to enter a concavo-convex pattern at the time of coating of photocatalyst layer 103, and it is difficult to form photocatalyst layer 103 in a concavo-convex pattern.

Next, a size of the film in a width direction is not particularly limited, and a length of a width of the concavo-convex pattern is preferably in a range of 50 μm to 500 μm inclusive, because an effect of preventing peeling failure at the time of in-molding is obtained. When the size of the concavo-convex pattern in a width direction is equal to or smaller than 50 μm, it is difficult to visually determine the concavo-convex pattern on a surface of a molded product, and when the size thereof is greater than 500 μm, the size of the concavo-convex pattern is excessively large, this portion becomes a region in which peeling failure of protective layer 206 from photocatalyst layer 103 hardly occurs, at the time of in-molding. However, the depth and size of the concavo-convex pattern changes depending on the design. Therefore, the depth and size thereof is not particularly limited to the ranges described above, as long as the same effects are obtained.

In concavo-convex pattern-attached transfer film 200 of the invention, photocatalyst microparticles 104 having sizes smaller than the sizes of the concavo-convex pattern in the depth direction and the width direction. Accordingly, when decomposing the organic resins configuring protective layer 206 in the concavo-convex pattern by photocatalysis of photocatalyst microparticles 104, a change of the concavo-convex pattern in the composition due to photocatalysis is prevented, and a plurality of fine voids 119 which is not visually confirmed, can be generated in the concavo-convex pattern, on the surface of protective layer 206 adjacent to photocatalyst layer 103. Accordingly, it is possible to increase the surface area of voids 119 on the boundary between photocatalyst layer 103 and protective layer 206, and thus, it is possible to effectively decrease points of contact of boundary surfaces between photocatalyst layer 103 and protective layer 206. Therefore, it is possible to suitably adjust the peel strength between photocatalyst layer 103 and protective layer 206 and to transfer a concavo-convex pattern having high quality.

Next, in the invention, after forming protective layer 206, a primer layer, coloring layer 208, and adhesive layer 209 are printed using a gravure printer so that an average film thickness of each layer after drying becomes 3 μm.

Figure 4:
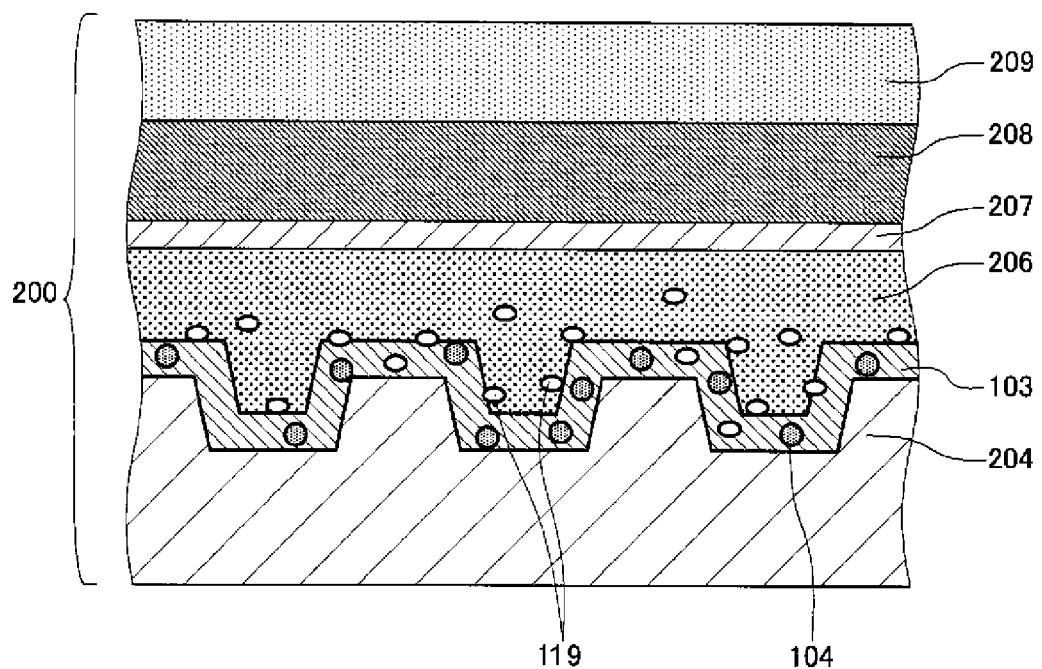
FIG. 4 is a sectional view showing a configuration of the concavo-convex pattern-attached transfer film of the invention.

FIG. 4 shows a sectional view showing a configuration of the concavo-convex pattern-attached transfer film of the invention obtained in this process. The same reference numerals are used in FIG. 4 for the same constituent elements shown in FIGS. 1 to 3B and 6 to 7H and the description thereof will be omitted.

As shown in FIG. 4, in concavo-convex pattern-attached transfer film 200, countless voids 119 having a size smaller than the size of photocatalyst microparticles 104 are present in the boundary between photocatalyst layer 103 and protective layer 206, there are no points of contact between photocatalyst layer 103 and protective layer 206 in countless voids 119, and accordingly, adhesiveness between photocatalyst layer 103 and protective layer 206 is deteriorated. As a result, in concavo-convex pattern-attached transfer film 200 of the invention, the peel strength between photocatalyst layer 103 and protective layer 206 is further decreased than that in the concavo-convex pattern-attached transfer film of the related art, due to voids 119 which countlessly present between photocatalyst layer 103 and protective layer 206. As a result of performing in-molding by ABS resins using concavo-convex pattern-attached transfer film 200, the peel strength between photocatalyst layer 103 and protective layer 206 of the concavo-convex pattern is lower than that in the concavo-convex pattern-attached transfer film of the related art, protective layer 206 is smoothly peeled from photocatalyst layer 103 of the concavo-convex pattern after molding, and concavo-convex pattern-attached transfer film 200 in which transfer failure of the transfer layer including the layers from protective layer 206, to a molded product hardly occurs.

The in-molding may be performed using transfer film 200 in which voids 119 are formed in advance, but transfer film 100 in which voids 119 are not formed and only photocatalyst microparticles 104 are provided may be used, and an amount of necessary voids 119 may be formed by emitting ultraviolet rays after inserting the transfer film into a die and before injecting the resin. When voids 119 are formed during the in-molding, it is possible to more specifically adjust the peel strength in accordance with a molded product or a treatment environment. Even in a case of inserting transfer film 200 in a die, the adjustment of voids 119 can be performed by further irradiating transfer film 200 with ultraviolet rays in a die. Even in this case, in transfer film 200 in which voids 119 are formed, voids 119 can be added in accordance with a molded product or a treatment environment, and it is possible to specifically adjust the peel strength.

The invention can be widely used when applying a design of a concavo-convex pattern to a surface of a molded exterior component of AV appliances such as a television or audio equipment, household electric appliances such as a refrigerator, a vacuum cleaner, or an air conditioner, mobile devices such as a mobile phone, or a cockpit or an audio panel of a vehicle using the in-molding, for example. As the concavo-convex pattern, a fine concavo-convex portion of an antireflection film may be used, and in this case, the surface of the transfer layer may be an antireflection film.

(Exemplary Embodiment 2)

In the transfer film of Exemplary Embodiment 1, in a portion transferred to a molded product, the peel strength between the photocatalyst layer and the protective layer is set to be comparatively low. Generally, a slitting step of cutting the edge of the transfer film may be performed, in order to arrange the width of the transfer film. In this slitting step, the transfer layers including layers from the protective layer may become powder and peeled off from the transfer film, and the powdery transfer layer peeled off becomes a reason of foil powder scattering. When the foil powder is scattered when slitting (cutting) the transfer film and some foil powder is mixed in a transfer film roll during the slitting, the foil powder becomes a foreign material. When a foreign material is attached to the surface of the transfer type film due to the mixed foil powder and the transfer film is wound as it is, the transfer layer of that portion have an unexpected size of the concavo-convex pattern and this causes printing failure. As the peel strength is low, the transfer layer becomes powder and is easily peeled off from the transfer film. Accordingly, the peel strength between the photocatalyst layer and the protective layer on the portion subjected to slitting is preferably maintained to be higher than that of the portion to be transferred.

As described above, when changing the peel strength of the transfer film in the transfer film plane, the peel strength of the entire film in which photocatalyst layer is formed is basically uniformly adjusted in the plane, by a method of adjusting the peel strength between the photocatalyst layer and the protective layer of the related art. Accordingly, the peel strength between the photocatalyst layer and the protective layer formed on the same film becomes substantially the same value. Thus, it was difficult to change the peel strength between the photocatalyst layer and the protective layer in only a specific portion in the transfer type film plane.

A transfer film having a slight difference in the peel strength in the transfer film, from the transfer film of Exemplary Embodiment 1 will be described as Exemplary Embodiment 2.

Figure 5A:
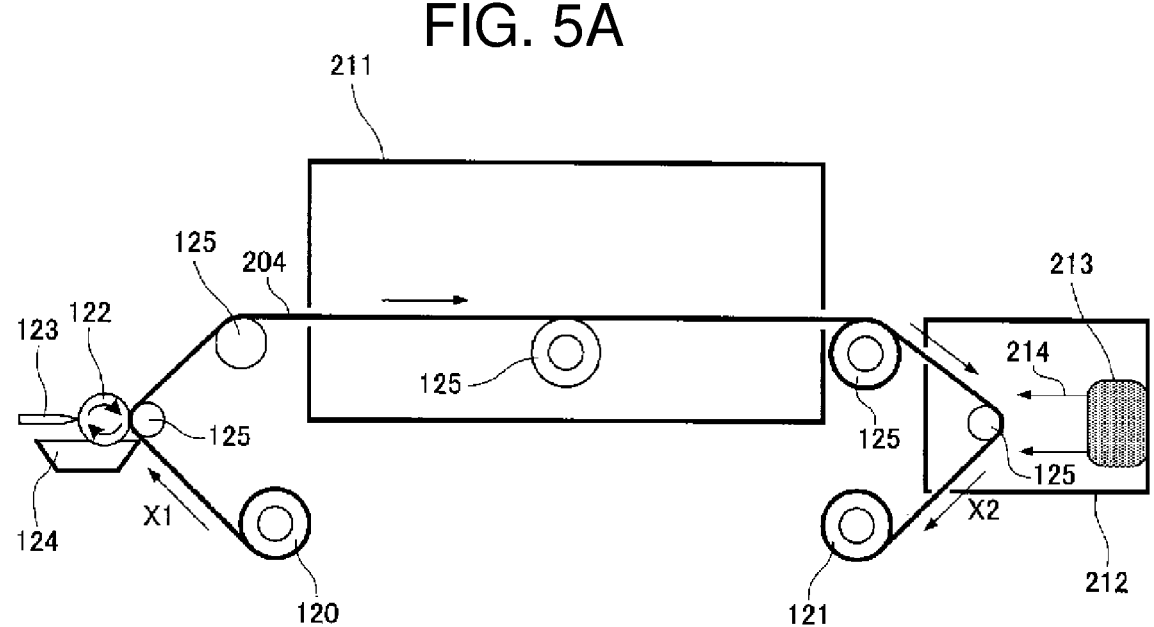
FIG. 5A is a sectional view explaining a coating process of a protective layer of a concavo-convex pattern-attached transfer film of Exemplary Embodiment 2 of the invention.
Figure 5B:
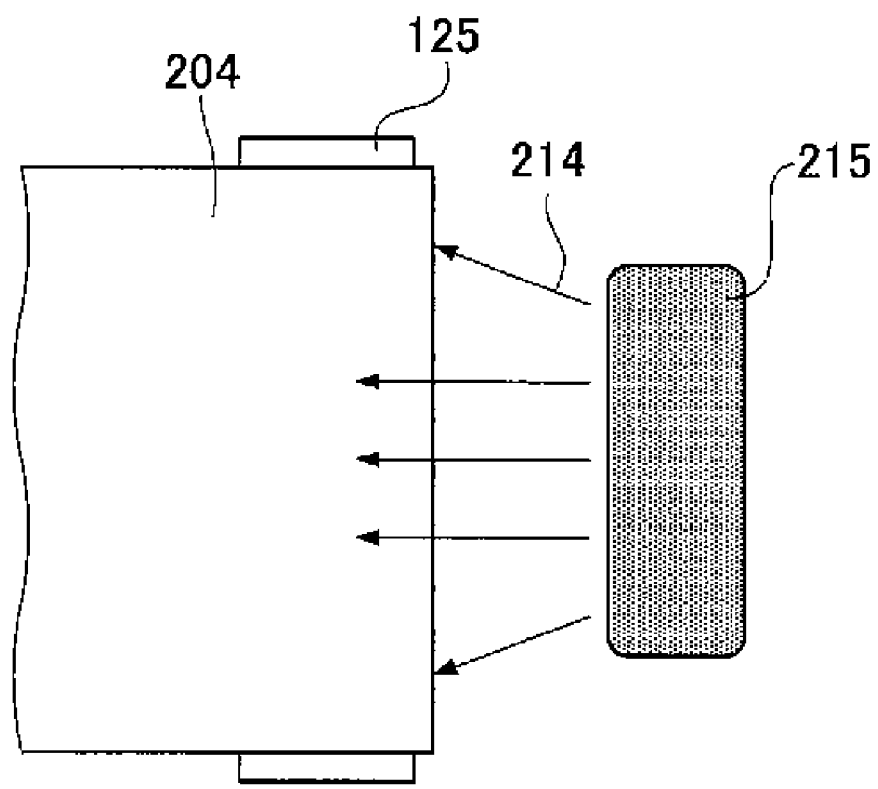
FIG. 5B is a schematic view showing an example of a configuration of an ultraviolet irradiating unit of Exemplary Embodiment 2.
Figure 5C:
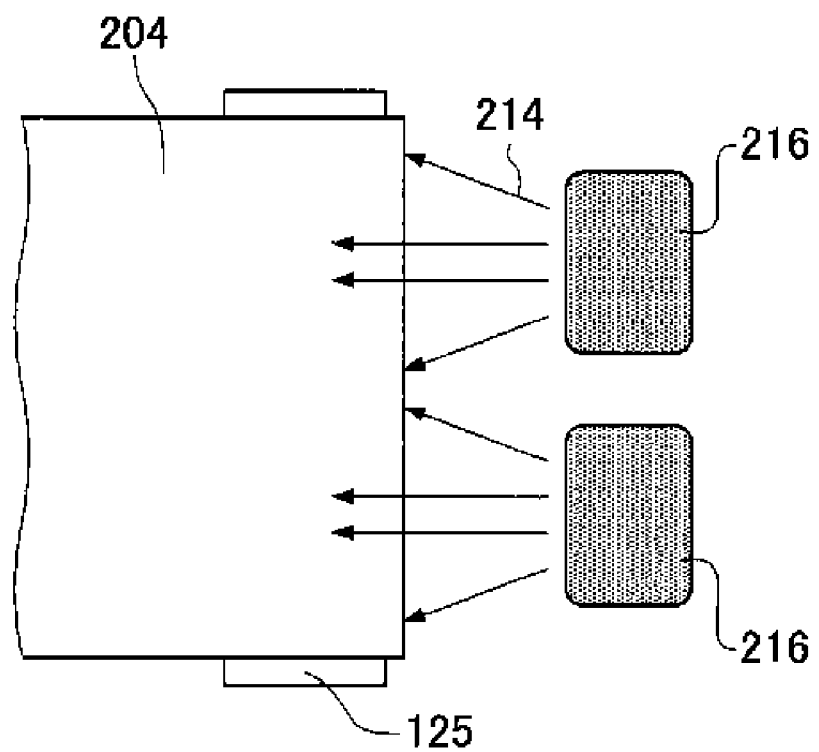
FIG. 5C is a schematic view showing an example of a configuration of the ultraviolet irradiating unit of Exemplary Embodiment 2.

FIG. 5A is a sectional view explaining a coating process of a protective layer of a concavo-convex pattern-attached transfer film of Exemplary Embodiment 2 of the invention. FIGS. 5B and 5C are schematic views showing an example of a configuration of an ultraviolet irradiating unit of Exemplary Embodiment 2 of the invention. The same reference numerals are used in FIGS. 5A to 5C for the same constituent elements shown in FIGS. 1 to 4 and 6 to 7H and the description thereof will be omitted.

Up to the coating of photocatalyst layer 103 by using base film 204 formed of an antistatic layer-attached PET film which is the same as that in Exemplary Embodiment 1, the coating was performed in the same process as in Exemplary Embodiment 1 using a gravure coater of a roll-to-roll system, by using base film 204. In the coating of photocatalyst layer 103, after the thermal drying step of photocatalyst layer 103, photocatalyst layer 103 was irradiated with ultraviolet rays 214 using ultraviolet lamp 213 in ultraviolet irradiating unit 212, in the following process. FIGS. 5B and 5C which are partially enlarged diagrams are plan views of the inside of ultraviolet irradiating unit 212 when performing the ultraviolet irradiation in two patterns.

In a case of performing the ultraviolet irradiating unit shown in FIG. 5B, after coating the entirety layers of the concavo-convex pattern-attached transfer film, the slitting of the edge surfaces of both sides in a width direction which is in a direction orthogonal to the feeding direction of base film 204 shown with arrows X1 and X2 is performed to align the heights of the central portion and the edge portions of the concavo-convex pattern-attached transfer film with each other. This is because that, when coating is performed with a gravure heater, the amount of the coating agent coated on the edges of base film 204 on both sides in the width direction orthogonal to the feeding direction of base film 204 shown with arrows, is greater than that coated on the center thereof, and accordingly, it is necessary to align the heights of the center and the edges of the concavo-convex pattern-attached transfer film with each other by performing slitting of the transfer film formed. A problem may occur during the slitting that, interlayer peeling may occur between photocatalyst layer 103 and protective layer 206 at the time of the slitting to cause peeling of the transfer layer including layers subsequent to protective layer 206 from photocatalyst layer 103, and the peeled layers may become foil powder and scatter around. When the scattered foil powder is mixed into the roll of the concavo-convex pattern-attached transfer film during the slitting, a concavo-convex portion is formed of the foil powder at a portion into which the foil powder is mixed, and the transfer layer of the concavo-convex pattern-attached transfer film is deformed or failure occurs due to foreign materials in the in-molding process. In order to prevent generation of foil powder, it is preferable that the peel strength between the photocatalyst layer 103 and protective layer 206 is high.

In the invention, in order to obtain the concavo-convex pattern-attached transfer film in which foil powder is hardly generated at the time of slitting of the concavo-convex pattern-attached transfer film, ultraviolet lamp 215 having a width smaller than the coating width of the film in the width direction orthogonal to the feeding direction of base film 204 shown with arrows, or an ultraviolet lamp having irradiation intensity in which an exposure dose of ultraviolet rays (illuminance) on the edges is lower than an exposure dose of ultraviolet rays (illuminance) on the center is used as shown in FIG. 5B. By emitting ultraviolet rays 214, the amount of decomposition of the organic resins configuring photocatalyst layer 103 and protective layer 205 due to photocatalyst layer 103 is set to be small on the edges than that on the center. Accordingly, the peel strength between photocatalyst layer 103 and protective layer 206 on both side edges in the width direction orthogonal to the feeding direction of base film 204 shown with arrows is maintained to be higher than that on the center of the concavo-convex pattern-attached transfer film, the transfer layer including layers subsequent to protective layer 206 is hardy peeled off from photocatalyst layer 103 at the time of the slitting, and it is possible to prevent generation of foil powder and prevent generation of foil powder at the time of slitting. Therefore, it is possible to prevent generation of foil powder generated at the time of slitting and reduce the amount of foil powder mixed into the roll of the concavo-convex pattern-attached transfer film during the slitting.

As shown in FIG. 5C, in the concavo-convex pattern-attached transfer film, a coating width in the width direction orthogonal to the feeding direction of base film 204 shown with arrows X1 and X2 is set to be wide and the slitting is also performed with respect to the center in the width direction orthogonal to the feeding direction of base film 204 shown with arrows, after the coating of the entirety layers, for example, and photocatalyst layer 103 may be divided into two or more regions in the width direction. In this case, in accordance with a slit width so that the exposure dose of ultraviolet rays to the edges and the center of photocatalyst layer 103 is decreased, two ultraviolet rays 216 may be installed or an ultraviolet cutting filter capable of adjusting an amount of specific ultraviolet energy may be attached at a portion corresponding to a portion where slitting is performed using a ultraviolet lamp, so that only the exposure dose of ultraviolet rays of the center can be adjusted with one ultraviolet lamp. When such ultraviolet lamps are used, the amount of decomposition of the organic resins configuring photocatalyst layer 103 and protective layer 206 on the edges and the center of the concavo-convex pattern-attached transfer film is decreased by irradiating the concavo-convex pattern-attached transfer film with ultraviolet rays 214, the peel strength between photocatalyst layer 103 and protective layer 206 at that portions can be maintained to be higher than portions subjected to transfer in other moldings. Accordingly, in the same manner as in FIG. 5B, it is possible to prevent generation of foil powder at the slit portion at the time of slitting, the scattering of the foil powder at the time of slitting is prevented and mixing of foreign materials into the roll of the concavo-convex pattern-attached transfer film due to the scattering of the foil powder at the time of slitting is prevented. Therefore, it is possible to provide a concavo-convex pattern-attached transfer film having less failure due to foil powder mixing.

As described above, when the exposure dose of ultraviolet rays 214 is adjusted so that the exposure dose of ultraviolet rays 214 is decreased only on portions to be slit in a film width direction, in accordance with the shape of slits of the concavo-convex pattern-attached transfer film after the coating, it is possible to prevent scattering of foil powder generated at the time of slitting the concavo-convex pattern-attached transfer film.

INDUSTRIAL APPLICABILITY

The invention can optimally adjust peel strength between a peeling layer and a transfer layer and is useful for a transfer film used in in-molding and a method for manufacturing the transfer film.

The invention claimed is:
1. A transfer film for in-molding, comprising:
a base film;
a transfer layer including a resin; and
a photocatalyst layer sandwiched between the base film and the transfer layer, wherein the photocatalyst layer includes photocatalyst microparticles and a resin and is peelably in contact with the transfer layer, the transfer layer has a concavo-convex pattern on a surface in contact with the photocatalyst layer, each of the transfer layer and the photocatalyst layer has a boundary region between the transfer layer and the photocatalyst layer, the boundary region in the transfer layer or the photocatalyst layer has a plurality of voids formed by irradiating the photocatalyst microparticles, the voids of the plurality of voids have an average width and the photocatalyst microparticles have an average particle diameter, and the average width of the plurality of voids is smaller than the average particle diameter of the photocatalyst microparticles.

2. The transfer film of claim 1, wherein the resin in the transfer layer is an organic resin.

3. The transfer film of claim 1, wherein a region other than the boundary region in the transfer layer or the photocatalyst layer has voids formed by irradiating the phothocatalyst microparticles, and a number of the plurality of voids formed in the boundary region in the transfer layer or the photocatalyst layer is larger than a number of the voids formed in the region other than the boundary region in the transfer layer or the photocalalyst layer.

4. The transfer film of claim 1, wherein the concavo-convex pattern has a depth; and the depth of the concavo-convex pattern is greater than the average particle diameter of the photocatalyst microparticles.

5. The transfer film of claim 1, wherein the average particle diameter of the photocatalyst microparticles is 0.01 µm to 0.2 µm inclusive.

6. The transfer film of claim 1, wherein:

the transfer film is rolled up as a roll;

the roll has a width;

the transfer film has a central portion and edges in a width direction of the roll;

the transfer film has peel strengths between the photocatalyst layer and the transfer layer; and the peel strengths on both edges are higher than the peel strength in the central portion.

* * * * *